United States Patent
Kawakami et al.

(10) Patent No.: US 7,826,165 B2
(45) Date of Patent: Nov. 2, 2010

(54) SERVO SIGNAL RECORDING APPARATUS

(75) Inventors: Shinji Kawakami, Osaka (JP); Toshio Kawakita, Osaka (JP)

(73) Assignee: Hitachi Maxell, Ltd., Ibaraki-shi, Osaka (JP)

( * ) Notice: Subject to any disclaimer, the term of this patent is extended or adjusted under 35 U.S.C. 154(b) by 287 days.

(21) Appl. No.: 12/123,747

(22) Filed: May 20, 2008

(65) Prior Publication Data

US 2009/0279197 A1    Nov. 12, 2009

(30) Foreign Application Priority Data

May 21, 2007    (JP) .............................. 2007-134038

(51) Int. Cl.
*G11B 5/584* (2006.01)
(52) U.S. Cl. ...................................... 360/75; 360/77.12
(58) Field of Classification Search ........................ None
See application file for complete search history.

(56) References Cited

U.S. PATENT DOCUMENTS

| | | | | |
|---|---|---|---|---|
| 5,343,341 A | * | 8/1994 | Jahren | 360/77.12 |
| 5,379,165 A | * | 1/1995 | Pahr | 360/77.12 |
| 5,675,448 A | * | 10/1997 | Molstad et al. | 360/77.12 |
| 5,689,384 A | | 11/1997 | Albrecht et al. | |
| 6,226,688 B1 | | 5/2001 | Frary | |
| 6,710,967 B2 | * | 3/2004 | Hennecken et al. | 360/77.12 |
| 6,865,050 B2 | * | 3/2005 | Nakao et al. | 360/75 |
| 6,873,486 B2 | * | 3/2005 | Tateishi | 360/71 |
| 6,937,413 B2 | * | 8/2005 | Bui et al. | 360/75 |
| 6,940,681 B2 | * | 9/2005 | Bellesis et al. | 360/77.12 |
| 6,963,467 B2 | * | 11/2005 | Bui et al. | 360/77.12 |
| 7,136,255 B2 | * | 11/2006 | Mahnad et al. | 360/75 |
| 7,379,258 B2 | * | 5/2008 | Nakao et al. | 360/75 |
| 7,428,118 B2 | * | 9/2008 | Duran | 360/75 |

FOREIGN PATENT DOCUMENTS

JP    8-30942 A    2/1996

* cited by examiner

*Primary Examiner*—Hoa T Nguyen
*Assistant Examiner*—James L Habermehl
(74) *Attorney, Agent, or Firm*—Birch, Stewart, Kolasch & Birch, LLP (57) ABSTRACT

A servo signal recording apparatus of the present invention is provided with a tape motion measurement unit 5 that measures the lateral motion of a magnetic tape 3, and outputs tape motion information, a signal processing unit 20 that generates a servo signal that includes the tape motion information output from the tape motion measurement unit 5, and a servo signal recording head 4 that records the servo signal generated by the signal processing unit 20 to the magnetic tape 3. The tape motion measurement unit 5 measures the tape motion prior to the timing at which a servo signal is recorded to the magnetic tape 3 by the servo signal recording head 4, and records a servo signal that includes the tape motion information. This configuration enables a servo signal that can be used to perform tracking servo at high speed and with high accuracy to be written to a magnetic tape.

3 Claims, 6 Drawing Sheets

Data "0"

FIG. 3A

Data "1"

SERVO SIGNAL RECORDING APPARATUS

BACKGROUND OF THE INVENTION

1. Field of the Invention

The present invention relates to a servo signal recording apparatus that records a servo signal for head tracking servo in a magnetic tape data storage system for a computer, and more specifically relates to a servo writer for data storage tape with superior head tracking servo characteristics.

2. Description of Related Art

Magnetic tape has a variety of applications such as audio tape, video tape and computer tape. Although particularly in the field of data backup tapes, magnetic tapes with a recording capacity of 800 GB or more per reel have been commercialized following increases in the capacity of hard disks for backup. High capacity backup tapes have been proposed with the development hereafter of techniques for backing up data exceeding 4 TB.

One conceivable method of increasing the capacity of magnetic tape is, for example, to make the magnetic tape thinner to increase the tape length per reel, without increasing the reel diameter of the magnetic tape per reel. Another method involves shortening the recording wavelength of data recorded on the magnetic tape to increase the longitudinal recording density of the magnetic tape. A further method involves reducing the recording track width of the magnetic tape to increase the lateral recording density of the magnetic tape (high density recording technique).

When the recording track width is reduced by employing a high density recording technique for magnetic tape, the magnetic head is unable to accurately follow the recording track due to the lateral motion of the magnetic tape during tape reproduction or the like, making errors more likely. In view of this, currently, systems that are able to record a servo signal to a magnetic layer or a back-coat layer of the magnetic tape during manufacture, and reproduce the servo signal from the magnetic tape to perform tracking servo in a tape drive have become mainstream.

As for servo systems, there is a magnetic servo system and an optical servo system. With the magnetic servo system, a servo signal is magnetically recorded to a magnetic layer of the magnetic tape, and the servo signal is magnetically read in the tape drive to perform tracking servo. With the optical servo system, a servo pattern constituted by a recessed array is formed on a back-coat layer on the magnetic tape with laser irradiation or the like, and the recessed array is optically read in the tape drive to perform tracking servo.

These servo systems enable the magnetic head to follow each track when recording data to magnetic tape or reproducing data from magnetic tape, even when the magnetic tape moves laterally relative to the magnetic head. Specifically, the servo signal recorded on the magnetic tape is firstly read with a servo head. Next, the read servo signal is analyzed and the lateral position of the magnetic tape in a head unit that includes at least a data recording head and a data reproducing head is controlled to allow the data recording head or the data reproducing head to follow each track. This enables information to be recorded to the correct position on a magnetic tape, and information recorded on a magnetic tape to be correctly reproduced.

Disclosed in patent document 1 (JP H8-30942 A) is a timing based servo system constituting an exemplary servo system. With this timing based servo system, the servo signal is recorded to magnetic tape in a pattern where the servo signal is at an angle to the lateral direction of the magnetic tape. The head position is confirmed from the time intervals between the peaks of the reproduction waveform when the servo signal is reproduced.

Disclosed in patent document 2 (specification of U.S. Pat. No. 6,226,688) is a head tracking servo method capable of recording and reproducing data without error by allowing the reproducing head to correctly follow a recording track at high speed, even in the case where the recording track width is further reduced and tape speed increased, thereby enabling compatibility with the increased recording density of magnetic tape.

However, a problem with the servo signal written to magnetic tape by the servo write head disclosed in patent documents 1 and 2 is that tracking servo cannot be performed at high speed and with high precision in a tape drive.

SUMMARY OF THE INVENTION

An object of the present invention is to provide a servo signal recording apparatus capable of writing a servo signal that can be used to perform tracking servo at high speed and with high precision to magnetic tape.

A servo signal recording apparatus of the present invention writes a servo signal for magnetic head position detection to a magnetic tape drawn out from a tape supply unit, while winding the magnetic tape with a tape winding unit, and includes a tape motion measurement unit that measures lateral motion of the magnetic tape, and outputs tape motion information, and a servo signal recording head that records a servo signal that includes the tape motion information output from the tape motion measurement unit to the magnetic tape. The servo signal recording head records a servo signal that includes tape motion information corresponding to each position on the magnetic tape measured by the tape motion measurement unit to a position at a distance from each position by a predetermined distance.

The present invention enables a servo signal that can be used to perform tracking servo at high speed and with high precision to be written to magnetic tape.

DETAILED DESCRIPTION OF THE INVENTION

The servo signal recording apparatus of the present invention can be configured such that the servo signal recording head is capable of recording a servo signal to at least two servo tracks on the magnetic tape, records a servo signal that includes tape motion information of each position on the magnetic tape measured by the tape motion measurement unit to one servo track, on a tape supply unit side of each position, and records a servo signal that includes tape motion information of each position on the magnetic tape measured by the tape motion measurement unit to another servo track, on a tape winding unit side of each position. This configuration enables tracking servo to be performed at high speed and with high precision, since a head control signal that includes tape motion information can be generated in advance, in the case where tracking servo is performed when running the magnetic tape forward and backward in a tape drive.

The servo signal recording apparatus can be configured to include a first tension control unit that controls a first running tension of the magnetic tape in a vicinity of the servo signal recording head, and a second tension control unit that controls a second running tension of the magnetic tape in a vicinity of the tape motion measurement unit, with the first tension control unit and the second tension control unit performing control such that the first running tension and the second running tension are of equal tension. According to this configuration, high-precision tape motion information is obtained by performing control so that the running tension of the magnetic tape in a vicinity of the servo signal recording head and the running tension of the magnetic tape in a vicinity of the tape motion measurement unit are the same. Accordingly, tracking servo can be performed at higher speed and with greater precision in a tape drive.

Embodiment 1

1. Configuration and Operation of Servo Signal Recording Apparatus

Figure 1:
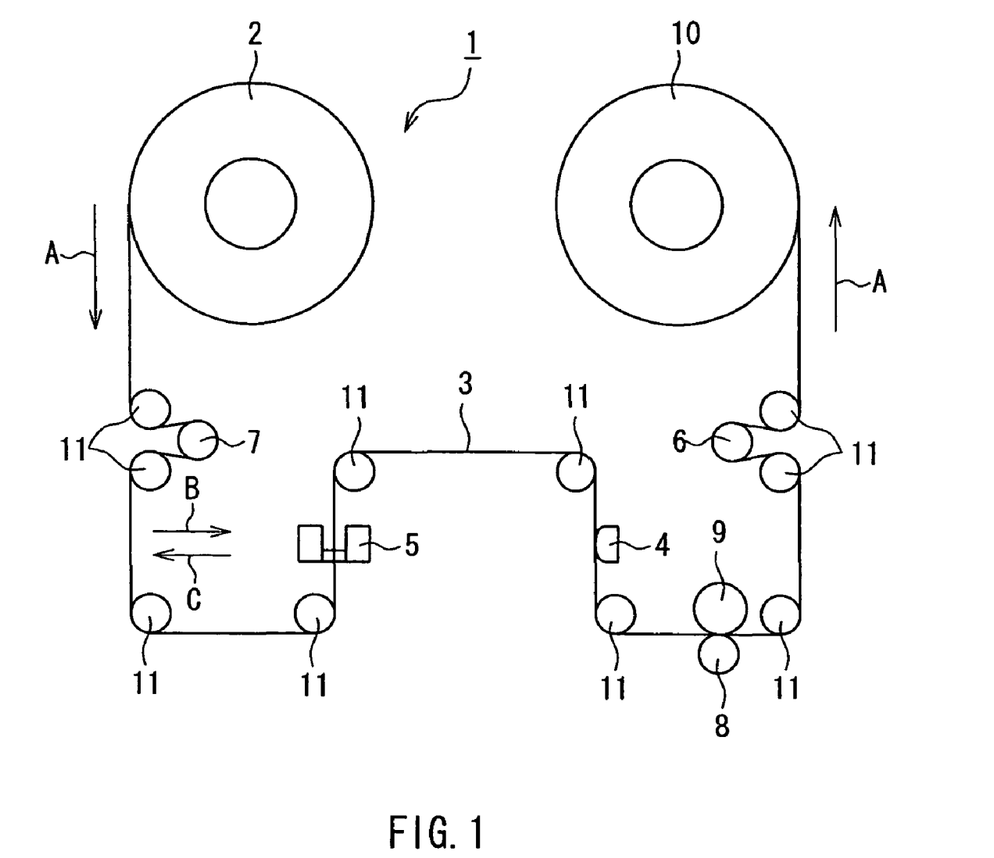
FIG. 1 is a schematic view showing the configuration of a servo signal recording apparatus in an embodiment 1.

FIG. 1 shows the configuration of a servo signal recording apparatus according to an embodiment 1. A servo writer 1 (servo signal recording apparatus) shown in FIG. 1, which is used in a manufacturing process of a magnetic tape cartridge, writes a servo signal for magnetic head position detection used in tracking servo in a pancake 2 (tape supply unit).

Figure 2A:
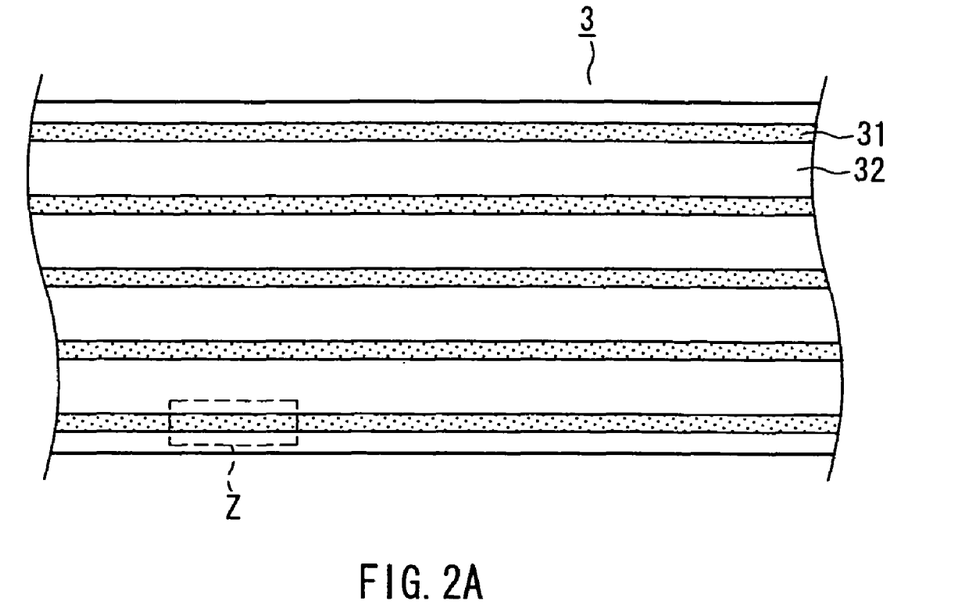
FIG. 2A is a schematic view showing the configuration of servo tracks.
Figure 2B:
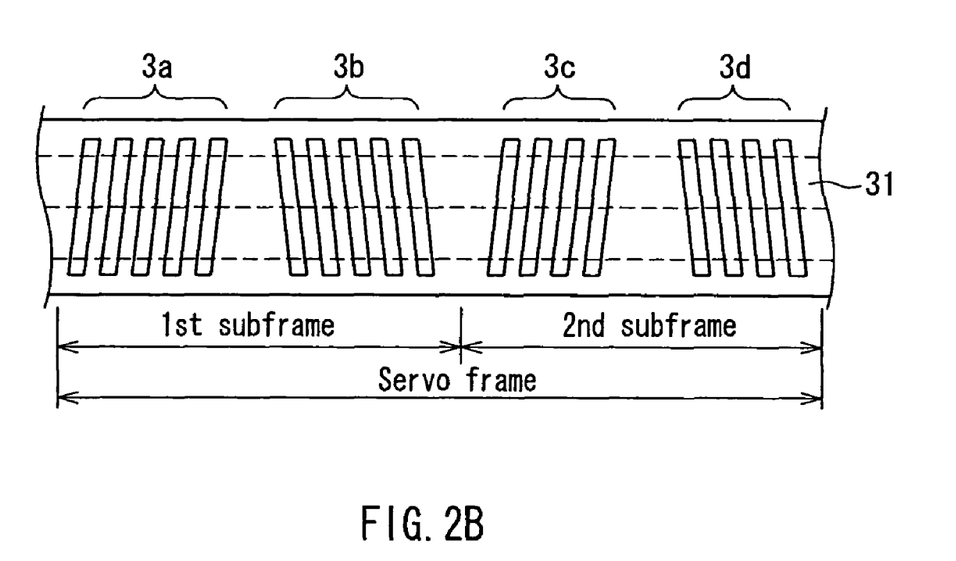
FIG. 2B is an enlarged view of a Z portion in FIG. 2A.

A servo signal recording head 4 is able to record a servo signal to a servo track of a magnetic tape 3. Note that the configuration of the servo signal and the servo track in the magnetic tape 3 will be described below with reference to FIG. 2.

A tape motion measurement unit 5 measures lateral motion of the magnetic tape 3 and outputs tape motion information constituting the measurement result. The tape motion measurement unit 5 irradiates laser light onto the edge of the magnetic tape 3 from above the magnetic tape 3, and receives laser light that is not blocked by the magnetic tape 3 with a light receiving unit disposed below the magnetic tape 3. The amount of laser light received by the light receiving unit at this time fluctuates depending on the lateral motion of the magnetic tape 3, enabling the lateral position of the magnetic tape 3 to be detected by the amount of light received by the light receiving unit. The tape motion measurement unit 5 compares the detected position information of the magnetic tape 3 with reference position information, and generates tape motion information that includes information on the amount and direction of the lateral motion of the magnetic tape 3.

After being drawn out from the pancake 2, the magnetic tape 3 is pinched between a capstan 8 and a pinch roller 9 and driven in the direction shown by the arrows A, while being guided by guide rollers 11 variously arranged in the servo writer 1, before being wound onto a take-up reel 10 (tape winding unit). The tension of the magnetic tape 3 while running is controlled by tension control units 6 and 7.

The magnetic tape 3 drawn out from the pancake 2 in the direction shown by the arrows A reaches the tape motion measurement unit 5 via the tension control unit 7. When the magnetic tape 3 passes the tape motion measurement unit 5, the tape motion measurement unit 5 measures the lateral motion of the magnetic tape 3 (i.e., motion of the edge of the magnetic tape 3) and generates tape motion information. The tape motion information generated by the tape motion measurement unit 5 is input to a signal processing unit 20 (see FIG. 4). The signal processing unit 20 generates a servo signal that includes the tape motion information by the tape motion measurement unit 5. The servo signal generated by the signal processing unit 20 is sent to the servo signal recording head 4.

The magnetic tape 3 that has passed the tape motion measurement unit 5 reaches the servo signal recording head 4. The servo signal recording head 4 records the servo signal to a servo band of the magnetic tape 3. Note that the servo signal recording method will be described in detail below.

The magnetic tape 3 that has passed the servo signal recording head 4 reaches the capstan 8 and the pinch roller 9. The magnetic tape 3 that has passed the capstan 8 and the pinch roller 9 is wound onto the take-up reel 10 via the tension control unit 6.

In the present embodiment, the tape motion measurement unit 5 is set on the tape supply side (pancake 2 side) of the servo signal recording head 4, as shown in FIG. 1. Setting the tape motion measurement unit 5 in this position enables a servo signal that includes tape motion information to be recorded, because tape motion information corresponding to the servo signal can be generated using the measurements, before the servo signal is written.

With normal magnetic tape for computer, the entire tape can be used to record data in a tape drive, by repeatedly running the tape forward to perform recording or reproduction while drawing the magnetic tape from the cartridge and running the tape backward to perform recording or reproduction while rewinding the magnetic tape back into the cartridge.

The servo signal recording apparatus of the present embodiment has means for writing a servo signal to at least two servo bands of the magnetic tape 3. The servo signal recording apparatus is able to record a servo signal that includes tape motion information for when the tape runs forward to one of the two servo bands, and to record a servo signal that includes tape motion information for when the tape runs backward to the other servo band.

This enables tape motion information to be read before data is reproduced and the head position to be immediately adjusted according to the motion in the magnetic tape 3, for both forward running and backward running. Therefore, tracking servo can be performed at high speed and with high precision.

2. Configuration of Servo Signal

FIG. 2A shows the configuration of servo bands and data bands in the magnetic tape 3. As shown in FIG. 2A, the magnetic tape 3 is provided with a servo band 31 in which a servo pattern based on a servo signal is formed, and a data band 32 in which a data signal is recorded. FIG. 2B shows an enlarged view of a portion (Z portion in FIG. 2A) of the servo band 31. Note that the servo pattern is recorded by the servo writer 1 shown in FIG. 1.

As shown in FIG. 2B, a single servo frame of the servo pattern recorded in the servo band 31 is constituted by a first subframe and a second subframe. The first subframe includes a first stripe group 3a and a second stripe group 3b. The second subframe includes a third stripe group 3c and a fourth stripe group 3d. The first stripe group 3a is constituted by five mutually parallel stripes, which are formed at a slight angle (azimuth angle of 6°±5° in the present embodiment) to the lateral direction of the servo band 31. The second stripe group 3b is constituted by five mutually parallel stripes, which are formed at a slight angle (azimuth angle of 6°±5° in the present embodiment) to the lateral direction of the servo band 31. Note that the first stripe group 3a and the second stripe group 3b are angled towards each other. The third stripe group 3c is constituted by four mutually parallel stripes, which slant at the same angle and in the same direction as the servo tracks of the first stripe group 3a. The fourth stripe group 3d is constituted by four mutually parallel stripes, which slant at the same angle and in the same-direction as the stripes of the second stripe group 3b. That is, the servo frame is constituted by 18 stripes.

Figure 3A:
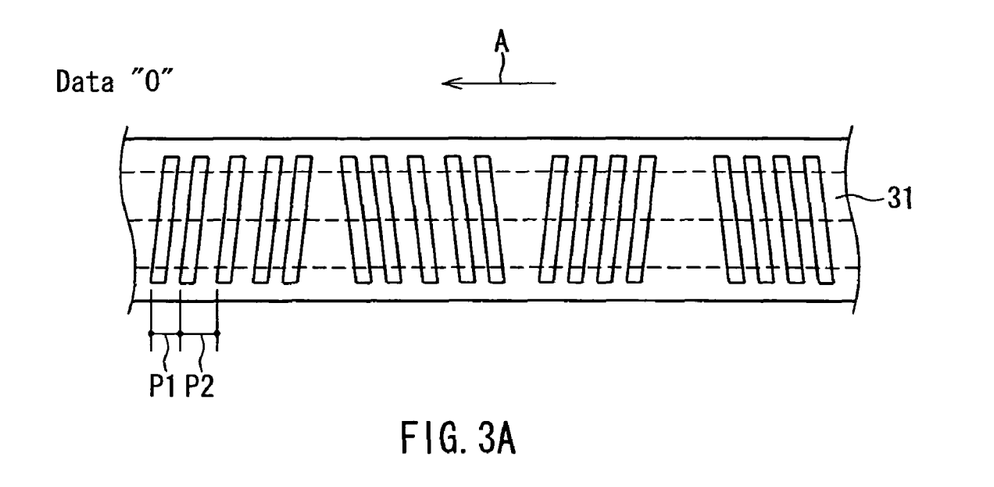
FIG. 3A is a schematic view showing the configuration of a servo track.
Figure 3B:
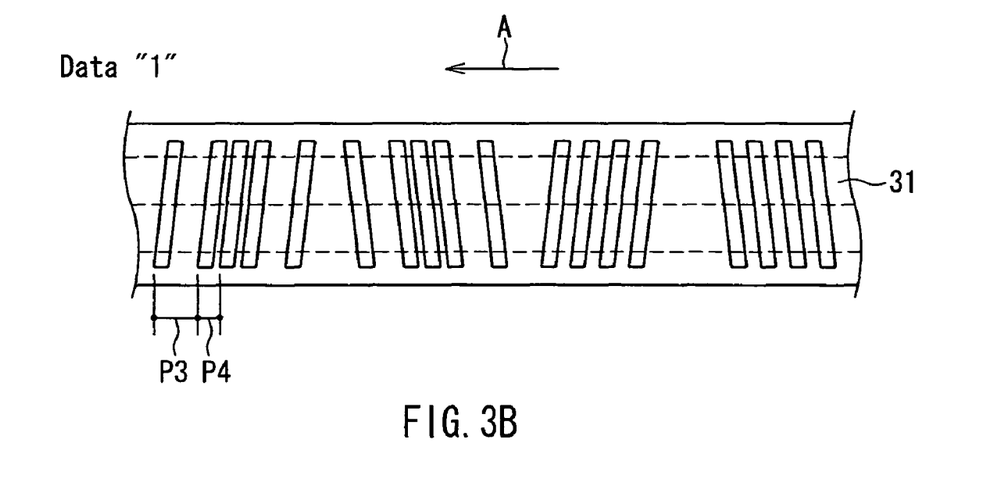
FIG. 3B is a schematic view showing the configuration of a servo track.

Note that while the intervals between the stripes recorded in the servo band 31 shown in FIG. 2B are equally spaced, the intervals between the stripes can be formed so as to differ systematically as shown in FIGS. 3A and 3B, in order to include a variety of information in the servo band 31. That is, forming the stripes as shown in FIGS. 3A and 3B enables tape motion information that can be used to execute the head tracking servo operation, as well as a variety of information related to the magnetic tape, the cartridge and the like to be included in the servo signal. Since information included in a servo signal is constituted by digital data, the stripes recorded to the servo band 31 need to be in the "0" pattern shown in FIG. 3A or the "1" pattern shown in FIG. 3B in order to be included in the servo band 31.

When recording a servo signal that includes the "0" information to the servo band 31, the intervals, in the first stripe group 3a and the second stripe group 3b, between the second and third stripes (pitch P2) and between the third and fourth stripes (same interval as pitch P2), counting in the tape running direction A, are recorded at a wider spacing than other portions (pitch P1), as shown in FIG. 3A. When recording a servo signal that includes the "1" information to the servo band 31, the intervals, in the first stripe group 3a and the second stripe group 3b, between the first and second stripes (pitch P3) and between the fourth and fifth stripes (same interval as pitch P3), counting in the tape running direction A, are recorded at a wider spacing than other portions (pitch P4), as shown in FIG. 3B. Giving systematicity to the intervals between the stripes, as shown in FIGS. 3A and 3B, enables a variety of information constituted by digital data to be included in the servo signal, together with being able to execute the head tracking servo operation. The present embodiment enables tape motion information to be included in the servo pattern.

3. Recording Method of Tape Motion Information

The operation for recording a servo signal that includes tape motion information output from the tape motion measurement unit 5 to the magnetic tape 3 in the servo writer 1 shown in FIG. 1 will be described.

Figure 4:
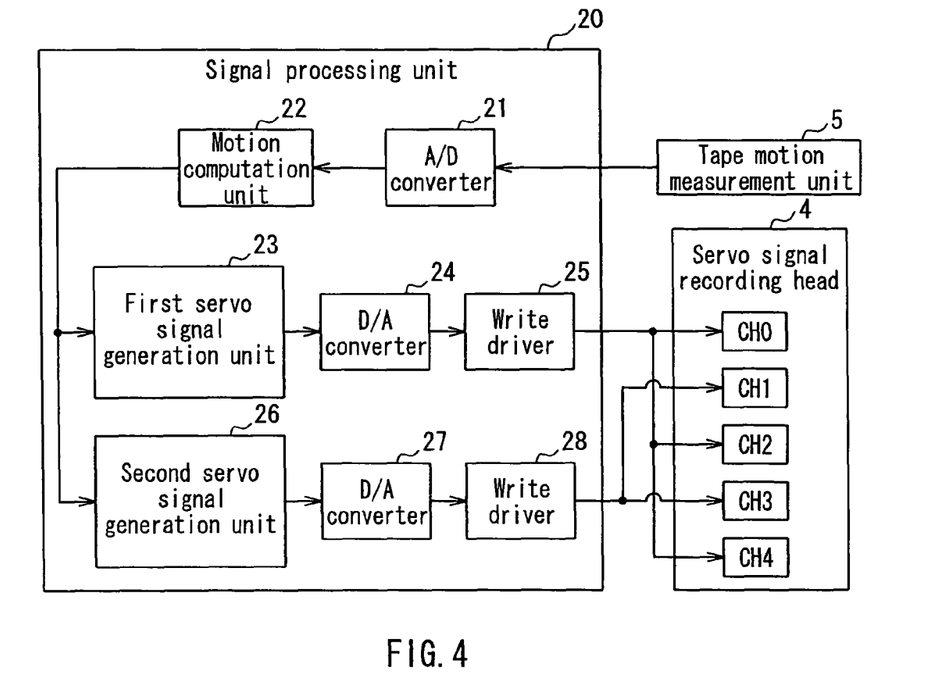
FIG. 4 is a block diagram showing the configuration of a signal processing unit.

FIG. 4 shows the configuration of the signal processing unit. As shown in FIG. 4, the signal processing unit 20 is provided with an analog-digital converter A/D converter) 21, a motion computation unit 22, a first servo signal generation unit 23, a second servo signal generation unit 26, digital-analog converters (D/A converters) 24 and 27, and write drivers 25 and 28.

Figure 5:
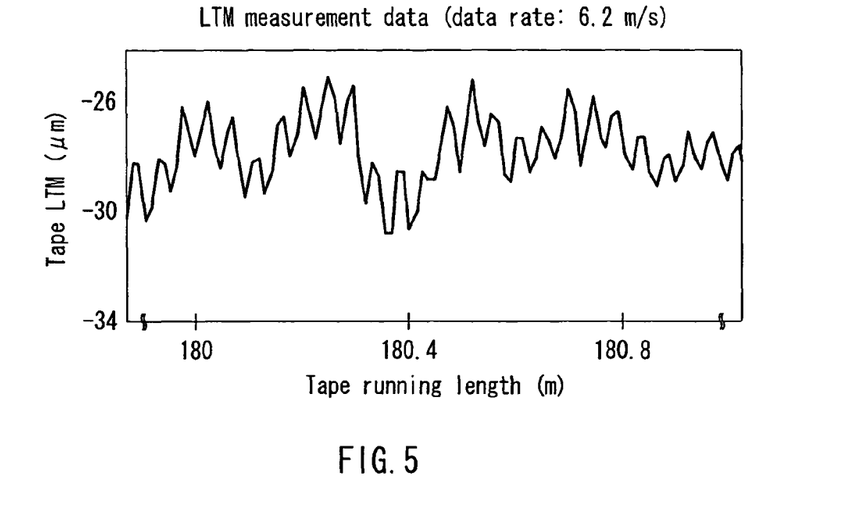
FIG. 5 is a characteristic diagram of LTM measurement data constituting exemplary tape motion information.

The A/D converter 21 converts the tape motion information (analog signal) output from the tape motion measurement unit 5 to a digital signal. Note that FIG. 5 shows LTM measurement data (LTM: Lateral Tape Motion) as exemplary tape motion information output from the tape motion measurement unit 5. In FIG. 5, the horizontal axis shows the running length of the magnetic tape 3, and the vertical axis shows the amount of lateral motion of the magnetic tape 3.

The motion computation unit 22 computes the amount of motion at an each position on the magnetic tape 3, based on the tape motion information output from the A/D converter 21. In the present embodiment, the motion computation unit 22 stores, as a table, position information (address information) computed by an internal clock and information on the amount of motion corresponding to the position information.

When the timing to record tape motion information to the magnetic tape 3 arrives, the first servo signal generation unit 23 and the second servo signal generation unit 26 read out the information on the amount of motion stored in the motion computation unit 22, and generate servo signals that include the information on the amount of motion. In the present embodiment, the first servo signal generation unit 23, which generates a servo signal for forward running, generates a servo signal for recording tape motion information to the magnetic tape before the measurement position reaches the servo signal recording head 4. The second servo signal generation unit 26, which generates a servo signal for backward running, generates a servo signal for recording tape motion information in which the time axis has been reversed to the magnetic tape after the measurement position has passed the servo signal recording head 4. Note that the recording timing will be described in detail below.

The D/A converter 24 converts the servo signal (digital signal) output from the first servo signal generation unit 23 to an analog servo signal. The D/A converter 27 converts the servo signal (digital signal) output from the second servo signal generation unit 26 to an analog servo signal.

The write driver 25 controls the recording current of head chips (head chips of channels CH0, CH2 and CH4 in the given example) in the servo signal recording head 4, based on the servo signal output from the D/A converter 24, to record a signal obtained by synthesizing the servo signal and the tape motion information to the servo band 31 of the magnetic tape 3. The write driver 28 controls the recording current of head chips (head chips of channels CH1 and CH3 in the given example) in the servo signal recording head 4, based on the servo signal output from the D/A converter 27, to record a signal obtained by synthesizing the servo signal and the tape motion information to the servo band 31 of the magnetic tape 3.

Figure 6:
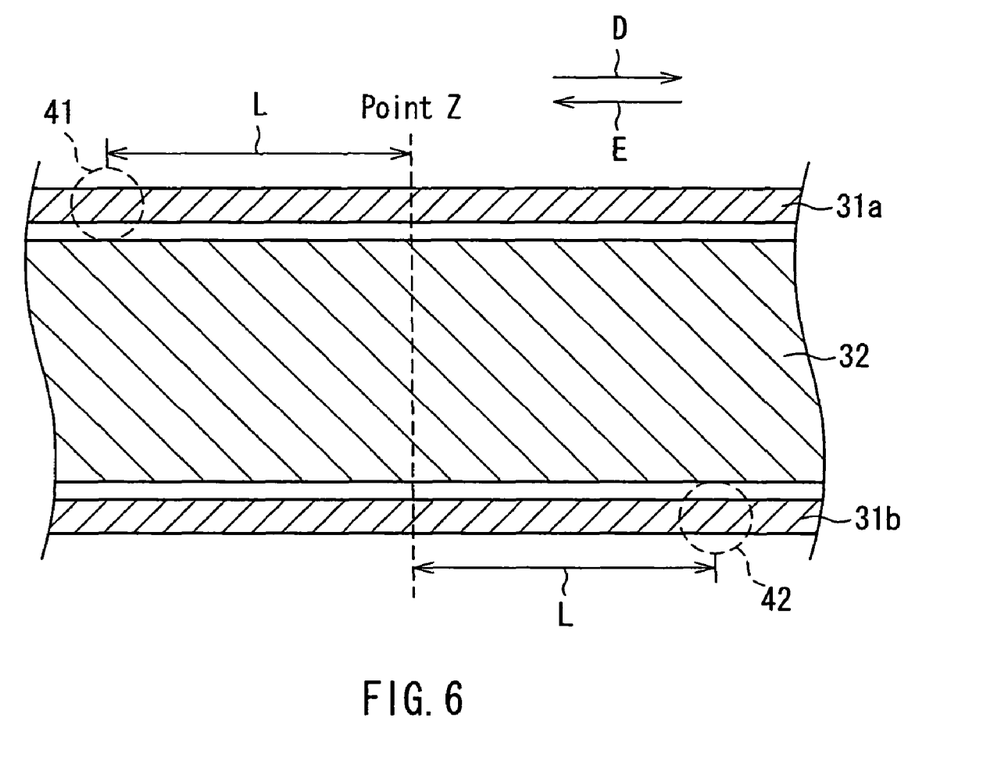
FIG. 6 is a schematic view showing the configuration of a servo track and a recording pattern in a vicinity thereof.

FIG. 6 is an enlarged view of the servo band 31 and the data band 32 in the magnetic tape 3. In FIG. 6, a first servo band 31a and a second servo band 31b are formed in adjacent positions in the lateral direction of the data band 32. As a result of the servo signal recording apparatus of the present embodiment, a servo signal that includes tape motion information for forward running is recorded to the first servo band 31a, and a servo signal that includes tape motion information for backward running is recorded to the second servo band 31b.

Hereinafter, the operation for recording a servo signal to the magnetic tape 3 will be described with reference to FIGS. 4 and 6.

Firstly, it is assumed that tape motion at point Z of the magnetic tape 3 has been measured in the tape motion measurement unit 5. The measured tape motion information is converted to a digital signal by the A/D converter 21 and input to the motion computation unit 22. Note that since the measurement operation in the tape motion measurement unit 5 is performed based on a sampling frequency of 100 Hz to 4 kHz, for example, tape motion information is input intermittently to the motion computation unit 22 while the magnetic tape 3 is running. The motion computation unit 22 computes the amount of motion based on the input tape motion information, and stores the computed amount of motion.

When the timing to record a servo signal that includes tape motion information to the magnetic tape 3 arrives, the first servo signal generation unit 23 acquires the information on the amount of motion from the motion computation unit 22, and generates a servo signal that includes the acquired information on the amount of motion.

The servo signal generated by the first servo signal generation unit 23 is input to the write driver 25 via the D/A converter 24. The write driver 25 controls the predetermined head chips included in the servo signal recording head 4 to record a signal obtained by synthesizing the servo signal and the tape motion information to the first servo band 31a. At the same time, the servo signal generated by the second servo signal generation unit 26 is input to the write driver 28 via the D/A converter 27. The write driver 28 controls the predetermined head chips included in the servo signal recording head 4 to record a signal obtained by synthesizing the servo signal and tape motion information in which the time axis has been reversed to the second servo band 31b.

Next, the timing at which a servo signal is recorded will be described. When recording the tape motion information of point Z shown in FIG. 6, for example, the tape motion information for forward running is recorded to a position 41, and the tape motion information for backward running is recorded to a position 42. That is, the tape motion information recorded in position 41 is recorded in a position that enables the servo head to read the tape motion information upon reaching position 41 before the data head mounted on the tape drive reaches point Z, when the magnetic tape 3 is run in the direction shown by the arrow E (forward) to perform recording or reproduction. Also, the tape motion information recorded in position 42 is recorded in a position that enables the servo head to read the tape motion information upon reaching position 42 before the data head mounted on the tape drive reaches point Z, when the magnetic tape 3 is run in the direction shown by the arrow D (backward) to perform recording or reproduction.

Note that the relation between a length L from point Z to positions 41 and 42, a running velocity V of the magnetic tape 3, and a time t from when running of the magnetic tape 3 is started in the tape drive until when the tracking servo of the head unit is completed is as follows.

$$L > t \times V \quad (1)$$

The positional relation between tape motion position 41 for forward running, tape motion position 42 for backward running and point Z shown in FIG. 6 and the tape motion measurement unit 5 and the servo signal recording head 4 shown in FIG. 1 is as follows. That is, a length L1 between the tape motion measurement unit 5 and the servo signal recording head 4 on the tape running path is greater than or equal to length L represented by equation 1. Length L1 is given by $$L1 = L + (t1 \times V) \quad (2)$$

where t1 is the time required for signal processing.

Tape motion information for forward running to be recorded to the first servo band 31a is measured by the tape motion measurement unit 5, and recorded to the magnetic tape 3 by the servo signal recording head 4, which is at a distance from the tape motion measurement unit 5 by length L1. Tape motion information for backward running to be recorded to the second servo band 31b is obtained by reversing the time axis of the tape motion information measured by the tape motion measurement unit 5, and recorded to the magnetic tape 3 by the servo signal recording head 4, which is at a distance from the tape motion measurement unit 5 by length L1. Note that tape motion information for backward running measured at an each position of the magnetic tape 3 is recorded to the second servo band 31b at the point in time at which the magnetic tape 3 has run a length 2L from the each position.

That is, positions 41 and 42 for recording tape motion information should be further at a distance from point Z than the distance that the magnetic tape 3 travels in the time required for servo tracking in a tape drive. If positions 41 and 42 are too close to point Z, tracking servo based on tape motion information cannot be performed, since the travel time is too short to enable the head unit to follow an each track by the time point Z reaches the head unit, when performing tracking servo of the magnetic tape 3 in a tape drive. As shown in the present embodiment, tracking servo based on tape motion information can be performed, because the tape motion information can be read before point Z reaches the head unit by distancing positions 41 and 42 from point Z by greater than or equal to length L.

Note that even if positions 41 and 42 are too far at a distance from point Z (i.e., if tape motion information is read by the head unit long before point Z reaches the head unit), the read tape motion information can be stored in recording means such as a memory or the like provided separately.

4. Effects of the Embodiment and Additional Remarks

By writing tape motion information of an each position on the magnetic tape 3 to a position at a distance from the each position in the tape running direction, the present embodiment enables tape motion information at a position where data to be reproduced is recorded to be read in advance and the head position to be quickly adjusted according to the motion of the magnetic tape 3, when reproducing data recorded on the magnetic tape 3.

Also, by recording a servo signal to the magnetic tape with a servo signal recording apparatus of the present embodiment, the present embodiment enables the magnetic head in a tape drive to follow each track accurately at high speed, even in the case where the recording track width is reduced and tape speed is increased with increased recording density.

Note that while the present embodiment describes a configuration in which a servo signal is recorded by the servo signal recording head 4 while measuring tape motion with the tape motion measurement unit 5, a configuration in which tape motion is measured for the entire magnetic tape 3 before recording a servo signal is also possible. Specifically, the magnetic tape 3 is firstly run from start to end, and tape motion is measured by the tape motion measurement unit 5 for the entire magnetic tape 3 in the longitudinal direction. Next, the measured tape motion information is stored in recording means such as a memory. Next, the tape motion information stored in the recording means is read out when recording a servo signal to the magnetic tape 3 with the servo signal recording head 4, and a servo signal that includes this tape motion information is generated and recorded to the magnetic tape 3. Because this configuration enables the number of times tape motion is measured to be increased, the number of samples of tape motion information can be increased, and tracking servo can be performed with higher precision. One method of including tape motion information in a servo signal involves, for example, binarizing the tape motion information and frequency modulating the servo signal using this binary data.

Embodiment 2

According to the present invention, information approaching tape LTM (Lateral Tape Motion), which is a factor contributing to linear distortion in the servo signal, can be obtained by measuring and including tape motion information in a servo signal when writing a servo signal to magnetic tape with a servo writer, thereby enabling the head to follow a servo track at high speed and with high precision. One of the factors influencing tape LTM is the running tension of the magnetic tape.

Figure 7:
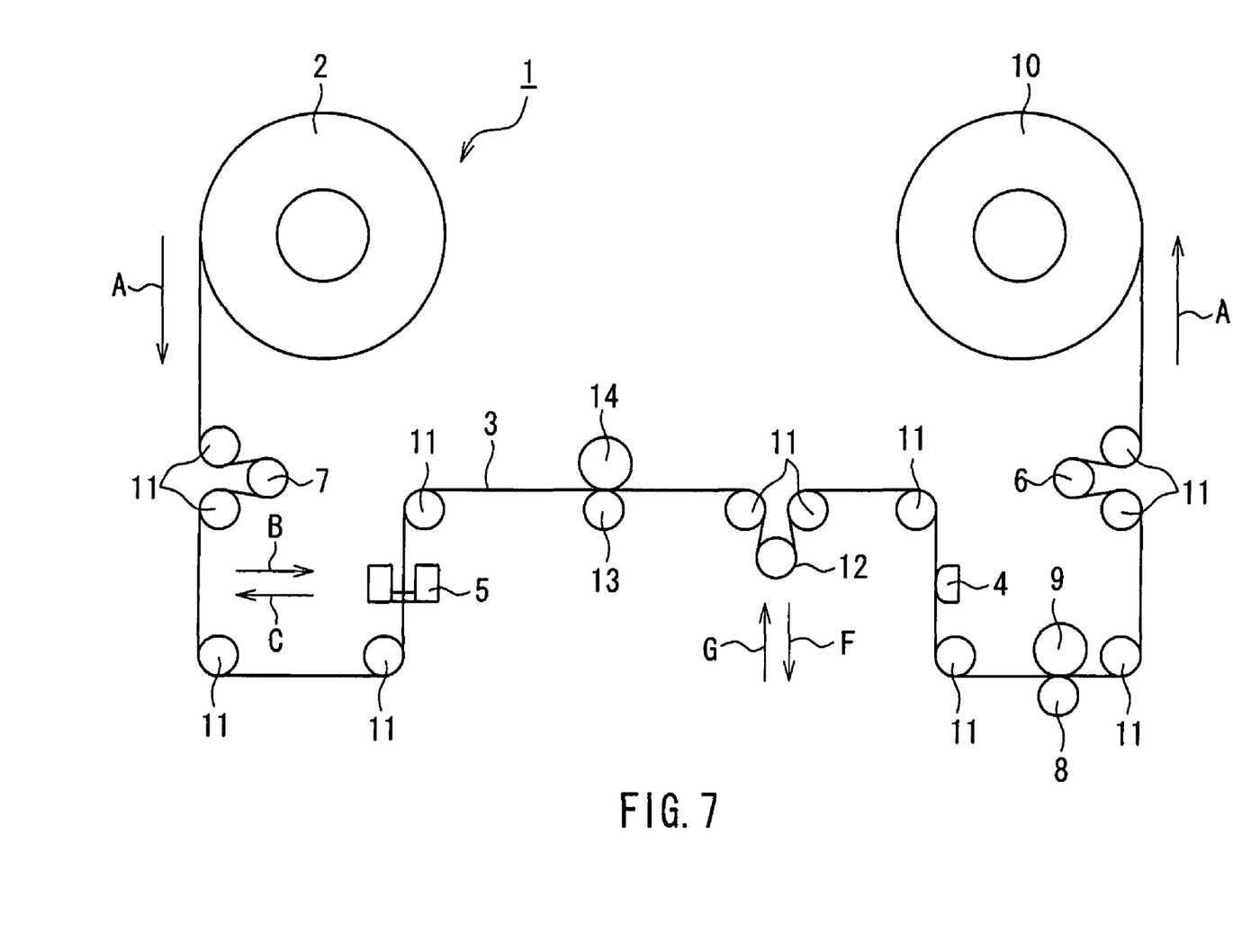
FIG. 7 is a schematic view showing the configuration of a servo signal recording apparatus in an embodiment 2.

FIG. 7 shows the configuration of a servo signal recording apparatus in an embodiment 2. In FIG. 7, the same reference numerals will be appended to constituent elements that are similar to the configuration shown in FIG. 1, and a detailed description thereof will be omitted. A tension control unit 12 is disposed between a capstan 13/pinch roller 14 and the servo signal recording head 4, and controls the running tension of the magnetic tape 3 in a vicinity of the servo signal recording head 4. The capstan 13 and the pinch roller 14 are disposed between the tension control unit 12 and the tape motion measurement unit 5, and are able to cut the tension of the magnetic tape 3.

The operations will now be described.

The magnetic tape 3 drawn out from the pancake 2 in the direction shown by the arrows A reaches the tape motion measurement unit 5 via the tension control unit 7. When the magnetic tape 3 passes the tape motion measurement unit 5, the tape motion measurement unit 5 measures the lateral motion of the magnetic tape 3 (i.e., motion of the edge of the magnetic tape 3) and generates tape motion information. The generated tape motion information is sent to the servo signal recording head 4. The magnetic tape 3 that has passed the tape motion measurement unit 5 reaches the capstan 13 and the pinch roller 14.

The magnetic tape 3 that has passed the capstan 13 and the pinch roller 14 reaches the servo signal recording head 4 via the tension control unit 12. The servo signal recording head 4 records a servo signal to the servo band of the magnetic tape 3. At this time, the servo signal recording head 4 includes tape motion information sent from the tape motion measurement unit 5 in the servo signal, before recording the servo signal to the magnetic tape 3. Note that the servo signal recording method will be described in detail below.

The magnetic tape 3 that has passed the servo signal recording head 4 reaches the capstan 8 and the pinch roller 9. The magnetic tape 3 that has passed the capstan 8 and the pinch roller 9 is wound onto the take-up reel 10, via the tension control unit 6.

Next, tension control of the magnetic tape 3 will be described.

The running tension in a vicinity of the tape motion measurement unit 5 can be adjusted by moving the tension control unit 7 in the direction shown by the arrow B or C. That is, if the running tension of the magnetic tape 3 in a vicinity of the tape motion measurement unit 5 is higher than a predetermined value, the tension control unit 7 is moved in the direction shown by the arrow C to lower the running tension of the magnetic tape 3. If the running tension of the magnetic tape 3 in a vicinity of the tape motion measurement unit 5 is lower than the predetermined value, the tension control unit 7 is moved in the direction shown by the arrow B to raise the running tension of the magnetic tape 3. Thereby adjusting running tension using the tension control unit 7, with the tension of part of the magnetic tape 3 cut by the capstan 13 and the pinch roller 14, enables the running tension to be adjusted so that the running tension in a vicinity of the tape motion measurement unit 5 is the predetermined value.

The running tension in a vicinity of the servo signal recording head 4 can be adjusted by moving the tension control unit 12 in the direction of the arrow F or G. That is, if the running tension of the magnetic tape 3 in a vicinity of the servo signal recording head 4 is higher than a predetermined value, the tension control unit 12 is moved in the direction shown by the arrow G to lower the running tension of the magnetic tape 3. If the running tension of the magnetic tape 3 in a vicinity of the servo signal recording head 4 is lower than the predetermined value, the tension control unit 12 is moved in the direction shown by the arrow F to raise the running tension of the magnetic tape 3. Thereby adjusting running tension using the tension control unit 12, with the tension of part of the magnetic tape 3 cut by the capstan 8 and the pinch roller 9, enables the running tension to be adjusted so that the running tension in a vicinity of the servo signal recording head 4 is constant.

In the present embodiment, running tension is adjusted so that the running tension of the magnetic tape 3 in a vicinity of the servo signal recording head 4 and the running tension of the magnetic tape 3 in a vicinity of the tape motion measurement unit 5 are the same.

With the running tension of the magnetic tape 3 having been adjusted as described above, the lateral motion of the magnetic tape 3 is measured by the tape motion measurement unit 5, a servo signal that includes tape motion information constituting the measurement result is generated, and the generated servo signal is recorded to the magnetic tape 3 by the servo signal recording head 4. Note that because the method of measuring tape motion and the method of recording a servo signal to the magnetic tape 3 are similar to the methods described in embodiment 1, description thereof in the present embodiment will be omitted.

The present embodiment enables the running tension of the magnetic tape 3 in a vicinity of the servo signal recording head 4 and the running tension of the magnetic tape 3 in a vicinity of the tape motion measurement unit 5 to be independently controlled. High precision tape motion information is thereby obtained by controlling running tension so that the running tension of the magnetic tape 3 in a vicinity of the servo signal recording head 4 and the running tension of the magnetic tape 3 in a vicinity of the tape motion measurement unit 5 are the same. Accordingly, tracking servo can be performed at higher speed and with greater precision in a tape drive.

The servo signal recording apparatus of the present invention is useful in data storage systems for computer that use magnetic tape as an information medium.

What is claimed is:

1. A servo signal recording apparatus that writes a servo signal for magnetic head position detection to a magnetic tape drawn out from a tape supply unit, while winding the magnetic tape with a tape winding unit, comprising:

a tape motion measurement unit that measures lateral motion of the magnetic tape, and outputs tape motion information; and a servo signal recording head that records a servo signal that includes the tape motion information output from the tape motion measurement unit to the magnetic tape, wherein the servo signal includes tape motion information corresponding to each position on the magnetic tape measured by the tape motion measurement unit to a position at a distance from each position by a predetermined distance.

2. The servo signal recording apparatus according to claim 1, wherein the servo signal recording head is capable of recording a servo signal to at least two servo tracks on the magnetic tape, records a servo signal that includes tape motion information of each position on the magnetic tape measured by the tape motion measurement unit to one servo track, on a tape supply unit side of each position, and records a servo signal that includes tape motion information of each position on the magnetic tape measured by the tape motion measurement unit to another servo track, on a tape winding unit side of each position.

3. The servo signal recording apparatus according to claim 1, comprising:

a first tension control unit that controls a first running tension of the magnetic tape in a vicinity of the servo signal recording head; and a second tension control unit that controls a second running tension of the magnetic tape in a vicinity of the tape motion measurement unit, wherein the first tension control unit and the second tension control unit perform control such that the first running tension and the second running tension are of equal tension.

* * * * *